US009997802B2

United States Patent
Brown et al.

(10) Patent No.: US 9,997,802 B2
(45) Date of Patent: Jun. 12, 2018

(54) HIGH ENERGY DENSITY ALUMINUM BATTERY

(71) Applicant: UT-BATTELLE, INC, Oak Ridge, TN (US)

(72) Inventors: Gilbert M. Brown, Knoxville, TN (US); Mariappan Parans Paranthaman, Knoxville, TN (US); Sheng Dai, Knoxville, TN (US); Xiao-Guang Sun, Knoxville, TN (US); Hansan Liu, Burnaby (CA)

(73) Assignee: UT-Battelle, LLC, Oak Ridge, TN (US)

( * ) Notice: Subject to any disclaimer, the term of this patent is extended or adjusted under 35 U.S.C. 154(b) by 0 days. days.

(21) Appl. No.: 15/257,455

(22) Filed: Sep. 6, 2016

(65) Prior Publication Data

US 2017/0033397 A1 Feb. 2, 2017

Related U.S. Application Data

(63) Continuation of application No. 13/247,417, filed on Sep. 28, 2011, now Pat. No. 9,466,853, which is a
(Continued)

(51) Int. Cl.
*H01M 6/16* (2006.01)
*H01M 10/054* (2010.01)
(Continued)

(52) U.S. Cl.
CPC .......... *H01M 10/054* (2013.01); *H01M 4/38* (2013.01); *H01M 4/463* (2013.01); *H01M 4/50* (2013.01);
(Continued)

(58) Field of Classification Search
CPC .. H01M 1/054; H01M 1/0568; H01M 1/0569; H01M 4/38; H01M 4/50;
(Continued)

(56) References Cited

U.S. PATENT DOCUMENTS 3,887,399 A 6/1975 Seiger
4,002,492 A 1/1977 Rao
(Continued)

FOREIGN PATENT DOCUMENTS

CN 1034829 A 8/1989
GB 1568170 5/1980
(Continued)

OTHER PUBLICATIONS

Apblett, A. et al., "Simple Synthesis of $[NS]^+[AlCl_4]$ and the Insertion Reaction with Alkylselenium Halides: X-Ray Structure of $[N_2S_2SeCl]^+[AlCl_4]$," *J. Chem. Soc., Chem. Commun.*, 1989, pp. 1596-1598.
(Continued)

*Primary Examiner* — Jimmy Vo
(74) *Attorney, Agent, or Firm* — Brinks Gilson & Lione; Jonathan M. Hartley

(57) ABSTRACT

Compositions and methods of making are provided for a high energy density lithium-aluminum battery. The battery comprises an anode comprising aluminum metal. The battery further comprises a cathode comprising a lithium metal oxide. The battery further comprises an electrolyte capable of supporting reversible deposition and stripping of aluminum at the anode, and reversible intercalation and deintercalation of lithium at the cathode.

15 Claims, 7 Drawing Sheets

Comparison of the theoretical energy density of an aluminum-ion battery with other batteries.

Related U.S. Application Data continuation-in-part of application No. 12/895,487, filed on Sep. 30, 2010, now abandoned.

(51) Int. Cl.

| | | |
|---|---|---|
| *H01M 4/46* | (2006.01) | |
| *H01M 4/50* | (2010.01) | |
| *H01M 10/0525* | (2010.01) | |
| *H01M 10/056* | (2010.01) | |
| *H01M 4/38* | (2006.01) | |
| *H01M 10/0568* | (2010.01) | |
| *H01M 10/0569* | (2010.01) | |
| *H01M 10/058* | (2010.01) | |

(52) U.S. Cl.
CPC ..... *H01M 10/056* (2013.01); *H01M 10/0525* (2013.01); *H01M 10/0568* (2013.01); *H01M 10/0569* (2013.01); *H01M 6/16* (2013.01); *H01M 10/058* (2013.01); *H01M 2300/0028* (2013.01); *Y02E 60/122* (2013.01); *Y10T 29/49108* (2015.01)

(58) Field of Classification Search
CPC ...... H01M 4/46; H01M 4/463; H01M 10/054; H01M 10/0568; H01M 10/0569
See application file for complete search history.

(56) References Cited

U.S. PATENT DOCUMENTS

| | | |
|---|---|---|
| 4,049,879 A | 9/1977 | Thompson et al. |
| 4,064,327 A | 12/1977 | King et al. |
| 4,091,191 A | 5/1978 | Gaines |
| 4,146,679 A | 3/1979 | Anthony et al. |
| 4,668,596 A | 5/1987 | Shacklette et al. |
| 4,882,244 A * | 11/1989 | Donahue ................. H01M 4/58 429/199 |
| 4,942,100 A | 7/1990 | Hunter et al. |
| 5,296,429 A | 3/1994 | Marsh et al. |
| 6,664,006 B1 | 12/2003 | Munshi |
| 7,225,960 B2 | 8/2007 | Dow et al. |
| 7,338,734 B2 | 3/2008 | Chiang et al. |
| 7,524,587 B2 | 4/2009 | Omote |
| 7,560,194 B2 | 7/2009 | Lin et al. |
| 2004/0131934 A1 | 7/2004 | Sugnaux et al. |
| 2004/0137326 A1 | 7/2004 | Munshi |
| 2004/0170890 A1* | 9/2004 | Matsunaga ............ C07C 211/63 429/137 |
| 2004/0191624 A1 | 9/2004 | Shinoda et al. |
| 2007/0243463 A1* | 10/2007 | Matsui .............. H01M 10/0569 429/188 |
| 2010/0279117 A1 | 11/2010 | Gu |
| 2012/0219859 A1 | 8/2012 | Doe et al. |

FOREIGN PATENT DOCUMENTS

| | | |
|---|---|---|
| JP | 60-249250 A | 12/1985 |
| JP | 2006-147442 A | 6/2006 |
| WO | WO 96/15562 | 5/1996 |

OTHER PUBLICATIONS

Basic Research Needs for Electrical Energy Storage, Report of the Basic Energy Sciences Workshop on Electrical Energy Storage, Apr. 2-4, 2007, 186 pages.

Carlin, R. T. et al., "Nucleation and Morphology Studies of Aluminum Deposited from and Ambient-Temperature Chloroaluminate Molten Salt," *J. Electrochem Soc.*, vol. 139, No. 10, 1992, pp. 2720-2727.

Dent, A.J. et al., "The Structure of Halogenomettallate Complexes Dissolved in Both Basic and Acidic Room-temperature Halogenoaluminate (III) Ionic Liquids, as Determined by EXAFS," *J. Chem Soc., Chem Comm*, 1990, pp. 315-316.

Elhadi, Z. M. et al., "Soft Chemistry Preparation of Layered $Al_{0.3}V_2O_5 \cdot 5H_2O$," *Ceramics International*, vol. 36, 2010, pp. 807-809.

Gifford, P.R. et al., "An Aluminum/Chlorine Rechargeable Cell Employing a Room Temperature Molten Salt Electrolyte," *J. Electrochem. Soc.*, vol. 135, No. 3, 1988, pp. 650-654.

Holleck, G. L. et al., "The Aluminum Electrode in $AlCl_3$-Aikali-Halide Melts," *J. Electrochem. Soc.*, vol. 119, No. 9, 1972, pp. 1161-1166.

Hori, Y. et al., "Aluminum Alloys for Aluminum Primary Cell," *Electrochimica Acta*, vol. 30, No. 9, 1985, pp. 1121-1124.

Hunter, J. C., "Preparation of a New Crystal Form of Manganese Dioxide: $\lambda$-$MnO_2$," *Journal of Solid State Chemistry*, vol. 39, 1981, pp. 142-147.

Hussey, C.L., "Room Temperature Molten Salt Systems," Advances in Molten Salt Chemistry, vol. 5, G. Mamantov, C. B. Mamantov (Eds.), Plenum, New York, 1983, pp. 185-230.

Ito. Y. et al. "Non-conventional Electrolytes for Electrochemical Applications," *Electrochimica Acta*, vol. 45, 2000, pp. 2611-2622.

Jiang, T. et al., "Electrodeposition of Aluminium from Ionic Liquids: Part I—Electrodeposition and Surface Morphology of Aluminium from Aluminium Chloride $(AlCl_3)$-1-Ethyl-3-Methylimidazolium Chloride ([EMIm]Cl) Ionic Liquids," *Surface & Coatings Technology*, vol. 201, 2006, pp. 1-9.

Jiang, T. et al., "Electrodeposition of Aluminium from Ionic Liquids: Part II—Studies on the Electrodeposition of Aluminum from Aluminum Chloride $(AlCl_3)$—Trimethylphenylammonium Chloride (TMPAC) Ionic Liquids," *Surface & Coatings Technology*, vol. 201, 2006, pp. 10-18.

Lai, P.K. et al., "Electrodeposition of Aluminium in Aluminium Chloride/1-Methyl-3-Ethylimidazolium Chloride," *J. of Electroanal Chem.*, vol. 248, No. 2, 1988, pp. 431-440.

Le, D. B. et al., "Intercalation of Polyvalent Cations into $V_2O_5$ Aerogels," *Chem. Mater.*, vol. 10, 1998, pp. 682-684.

Legrand, L. et al., "Behavior of Aluminium as Anode in Dimethylsulfone-based Electrolytes," *Electrochimica Acta*, vol. 39, No. 10, 1994, pp. 1427-1431.

Legrand, L. et al., "Raman Study of Aluminum Chloride-Dimethylsulfone Solutions," *Inorg. Chem.*, vol. 35, 1996, pp. 1310-1312.

Li, Q. et al., "Aluminum as Anode for Energy Storage and Conversion: A Review," *Journal of Power Sources*, vol. 110, 2002, pp. 1-10.

Luan, Z. et al., "Alumination and Ion Exchange of Mesoporous SBA-15 Molecular Sieves," *Chem. Mater.*, vol. 11, 1999, pp, 1621-1627.

Melton, T.J.et al.. "Electrochemical Studies of Sodium Chloride as a Lewis Buffer for Room Temperature Chloroaluminate Molten Salts," *J. Electrochem. Soc.*, vol. 137, No. 12, 1990, pp. 3865-3869.

Papageorgiou, N. et al., "The Effect of Cosolvents and Additives on the Electrochemical Properties of $[(Me)_3PhN][Al2Cl_7]$ Melts," *Electrochimica Acta*, vol. 38, No. 2/3, 1993, pp. 245-252.

Peng, C. et al., "Investigation of the Anodic Behavior of Al Current Collector in Room Temperature Ionic Liquid Electrolytes," *Electrochimica Acta*, vol. 53, 2008, pp. 4764-4772.

Rota, M. et al., "Bipolar $Al/P_2$ Battery with Planar Electrodes in Alkaline and Acidic Electrolytes." *J Appl. Electrochem*, vol. 25, 1995, pp. 114-121.

Schumm Jr., B., "Aluminum Perchlorate in Aluminum-$MnO_2$ Dry Cells," *J. Electrochem Soc.*, vol. 123, No. 11, 1976, pp. 1696-1698.

Scordilis-Kelley, C. et al., "Alkali Metal Reduction Potentials Measured in Chloroaluminate Ambient-Temperature Molten Salts," *J. Electrochem. Soc.*, vol. 139, No. 3, 1992, pp. 694-699.

Sivashanmugam, A. et al., "Electrochemical Performance of $Al/MnO_2$ Dry Cells: An Alternative to Lechlanche Dry Cells," *J. Electrochem Soc.*, vol. 155, No. 10, 2008, pp. A725-A728.

Tsuda, T. et al., "Electrochemical Applications of Room-Temperature Ionic Liquids,"The Electrochemical Society *Interface*, 2007, pp. 42-49.

Tsuda, T. et al., Chapter 2, "Electrochemistry of Room-Temperature Ionic Liquids and Melts," *Modern Aspects of Electrochemistry*, No. 45, R. E. White (ed.), Springer Science+Business Media, LLC, copyright 2009, pp. 63-174.

(56) References Cited

OTHER PUBLICATIONS

Tsuda, T. et al., "Electrochemistry of Titanium and the Electrodeposition of Al—Ti Alloys in the Lewis Acidic Aluminum Chloride-1-Ethyl-3-Methylimidazolium Chloride Melt," *J. Electrochem. Soc.*, vol. 150, No. 4, 2003, pp. C234-C243.

Ui, K. et al, "Development of Non-Flammable Lithium Secondary Battery with Room-Temperature Ionic Liquid Electrolye: Performance of Electroplated Al Film Negative Electrode," *Journal of Power Sources*, vol. 183, 2008, pp. 347-350.

Vestergaard, B. et al., "Molten Triazolium Chloride Systems as New Aluminum Battery Electrolytes," *J. Electrochem. Soc.*, vol. 140, No. 11, 1993, pp. 3108-3113.

Webber, A. et al., "Ionic Liquids for Lithium Ion and Related Batteries," W. van Schalkwijk and B. Scrosati (eds.), Kluwer Academic/Pienura Publishers, copyright 2002, Fulltext Preview, p. 185.

Welton. T., "Room-Temperature Ionic Liquids, Solvents for Synthesis and Catalysis," *Chem. Rev.*, vol. 99, No. 8, 1999, pp. 2071-2083.

Whittingham, M. S., "Lithium Batteries and Cathode Materials," *Chem. Rev.*, vol. 104, 2004, pp. 4271-4301.

Wilkes, J.S. et al., "A New Class of Room Temperature Molten Salts for Battery Application," Interim rept. Sep. 1980-Sep. 1981, 1981, abstract.

Yang, S. et al., "Design and Analysis of Aluminum/Air Battery System for Electric Vehicles," *Journal of Power Sources*, vol. 112, 2002, pp. 162-173.

Zeng, S. et al., "Post-Synthesis Alumination of SBA-15 in Aqueous Solution: A Versatile Tool for the Preparation of Acidic Al-SBA-15 Supports," *Microporous and Mesoporous Materials*, vol. 85, 2005, pp. 297-304.

Zhang, X. et al., "Novel Operation and Control of an Electric Vehicle Aluminum/Air Battery System," *Journal of Power Sources*, vol. 128, 2004, pp. 331-342.

Office Action dated Apr. 26, 2017 in U.S. Appl. No. 13/645,779.

Sun, X-G et al., "Polymer gel electrolytes for application in aluminum deposition and rechargeable aluminum ion batteries," Chem. Commun., 52:292-295 (2016).

Sun, X-G et al., "Polymer gel electrolytes for application in aluminum deposition and rechargeable aluminum ion batteries," electronic supplementary document (2016).

\* cited by examiner

Figure 1. Comparison of the theoretical energy density of an aluminum-ion battery with other batteries.

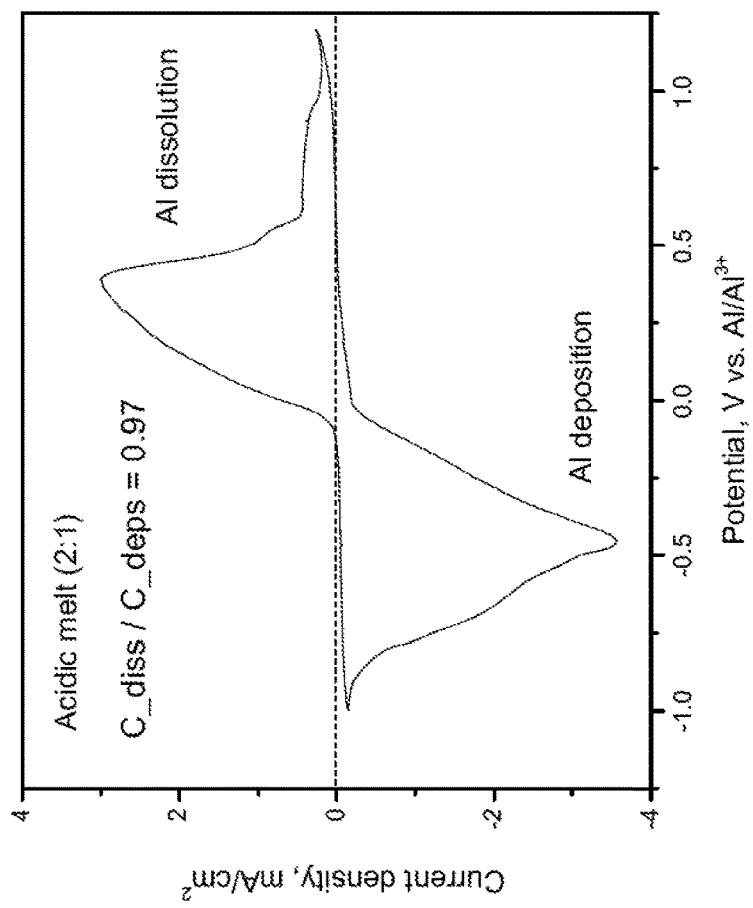
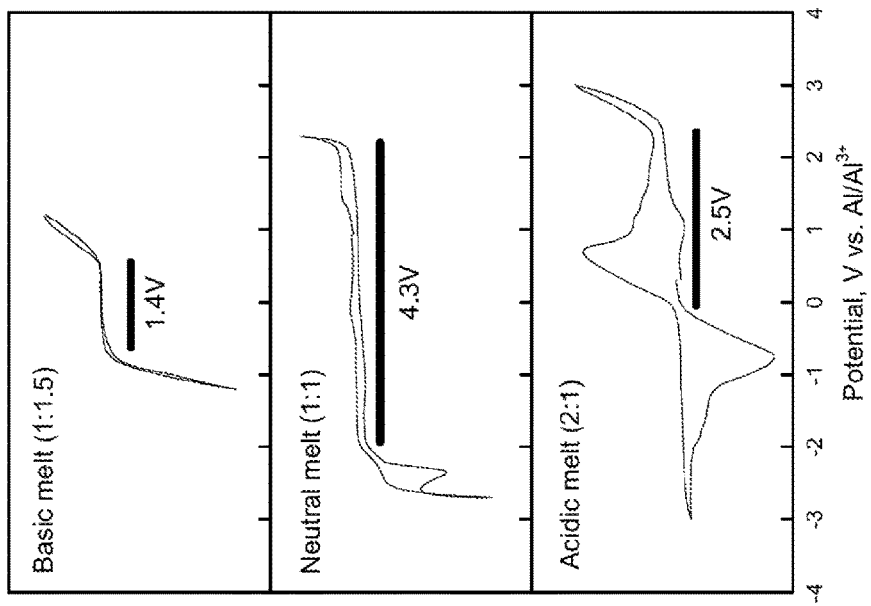
Figures 2A, 2B. Aluminum dissolution and deposition as a function of electrolyte composition (basic, neutral, acidic).

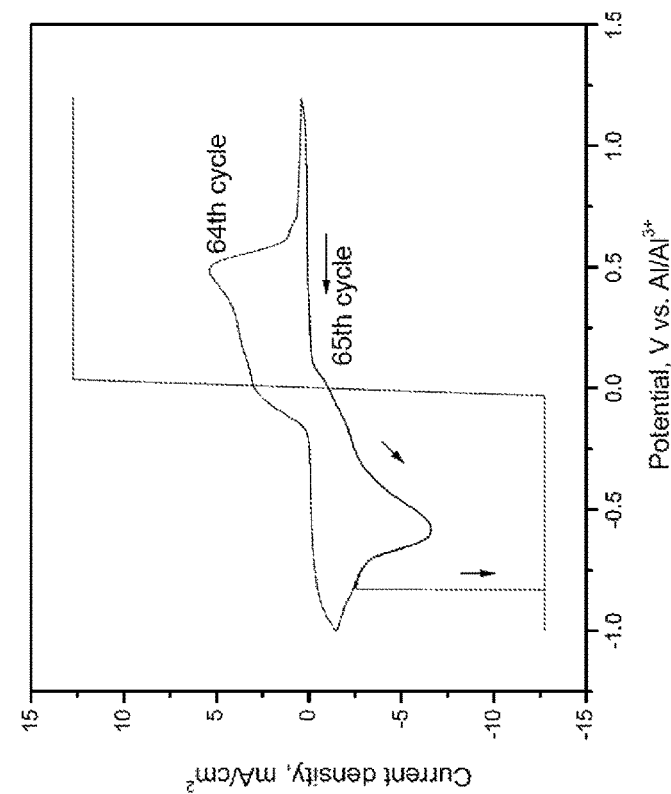
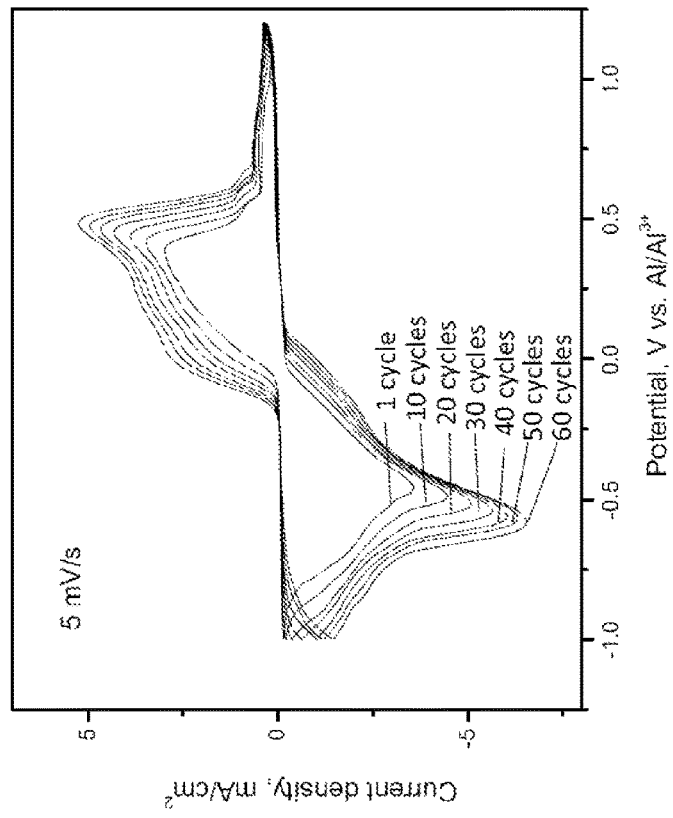
Figures 3A, 3B. Aluminum deposition and dissolution in acidic electrolyte mixture of 2:1 $AlCl_3$:EMIC.

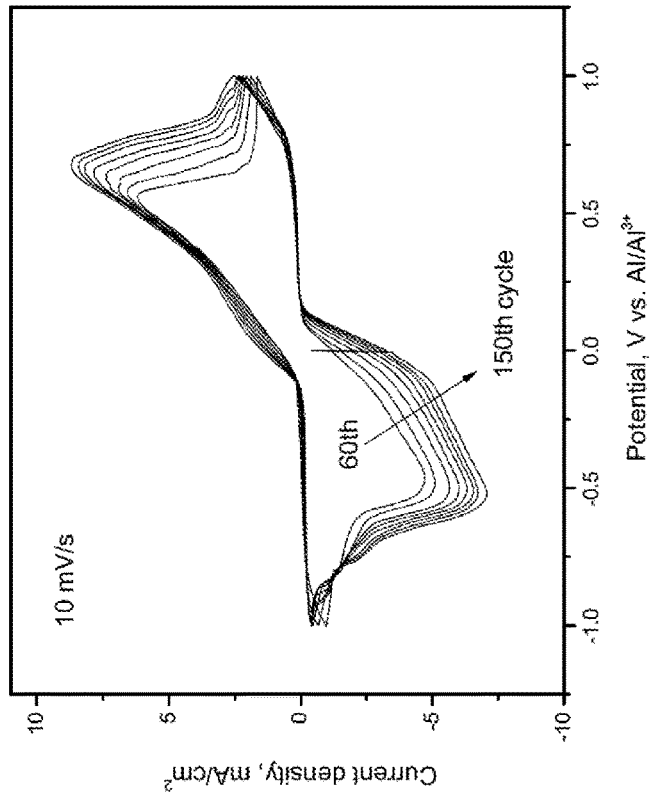
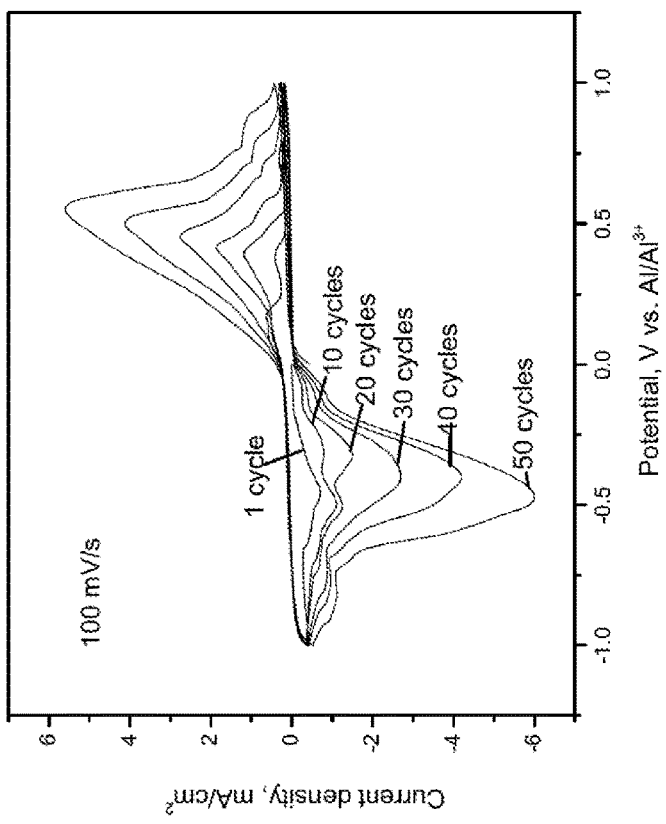
Figures 4A, 4B. Aluminum anode electrochemical behavior in acidic electrolyte mixture of 2:1 AlCl$_3$:EMIC.

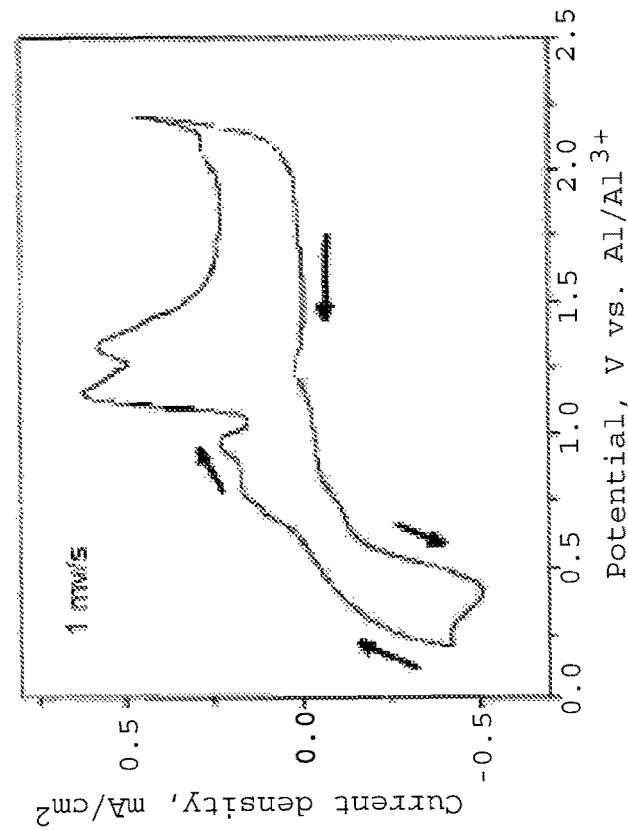
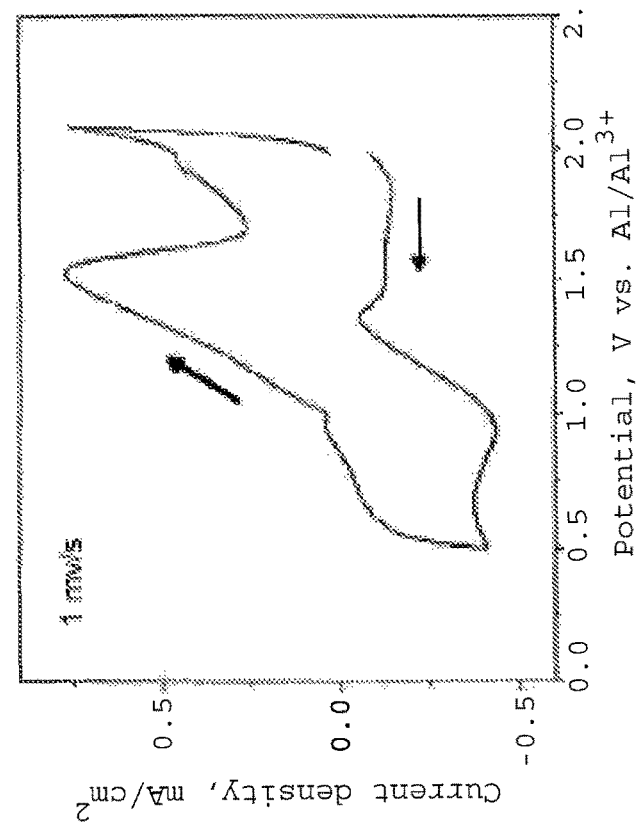
Figures 5A, 5B. Electrochemical responses for $MnO_2$ and $AlMn_3O_4$ cathodes in an acidic electrolyte mixture of 2:1 $AlCl_3$:EMIC.

HIGH ENERGY DENSITY ALUMINUM BATTERY

CROSS REFERENCE TO RELATED APPLICATIONS

This application is a continuation of U.S. patent application Ser. No. 13/247,417, filed Sep. 28, 2011, which is a continuation-in-part of U.S. patent application Ser. No. 12/895,487, filed Sep. 30, 2010, the disclosures of which are incorporated by reference herein.

STATEMENT OF GOVERNMENT INTEREST

The invention was made with government support under contract number DE-FOA-0000207 by the Department of Energy. The Government has certain rights in the invention.

BACKGROUND

There is great interest and motivation to make a transition from fossil energy based electricity to the generation from renewable sources such as solar or wind. These sources offer enormous potential for meeting future energy demands. However, the use of electricity generated from these intermittent sources requires efficient electrical energy storage. For large-scale, solar- or wind-based electrical generation to be practical, the development of new electrical energy storage systems are critical to meeting continuous energy demands and effectively leveling the cyclic nature of these energy sources. Transformational developments in electrical energy storage are needed. In particular, there are needs for secondary batteries (or secondary batteries assembled in a charged state) made from novel materials that would increase the level of energy storage per unit volume and decrease dead weight while maintaining stable electrode-electrolyte interfaces. There is potential for increases in charge density by utilizing multielectron redox couples, such as in an aluminum battery.

The currently available electric energy storage technologies fall far short of the requirements for efficiently providing electrical energy for transportation vehicles, commercial and residential electrical and heating applications, and even for many electrically powered consumer devices. In particular, electrical storage devices with high energy and power densities are needed to power electric vehicles with performance comparable to that of vehicles powered by petroleum-fueled internal combustion engines.

Previous attempts to utilize aluminum anodes in secondary batteries have been plagued by high corrosion rates, parasitic hydrogen evolution, and a decrease in the reversible electrode potential (i.e., cell voltage is considerably lower than the theoretical value) due to formation of an oxide film on the anode surface.

SUMMARY

Compositions and methods of making are disclosed for high energy density aluminum batteries.

In one embodiment, the battery comprises an anode comprising aluminum metal. The battery further comprises a cathode comprising a material capable of intercalating aluminum or lithium ions during a discharge cycle and deintercalating the aluminum or lithium ions during a charge cycle. The battery further comprises an electrolyte capable of supporting reversible deposition and stripping of aluminum at the anode, and reversible intercalation and deintercalation of aluminum or lithium at the cathode.

In certain embodiments, the battery is a primary battery. In some embodiments, the primary battery comprises a cathode material selected from the group consisting of $Ti(AlCl_4)_2$, $MnCl(AlCl_4)$, $Co(AlCl_4)_2$.

In certain embodiments, the battery is a secondary battery. In one embodiment, the secondary battery maintains a discharge capacity of at least 50% of an initial discharge capacity after 50 cycles. In certain embodiments, the battery is a secondary battery that is assembled in charged state.

In some embodiments, the anode is an aluminum metal alloy. In certain embodiments, the aluminum metal alloy comprises an element selected from the group consisting of: copper, magnesium, manganese, silicon, titanium, zinc, or mixtures thereof.

In certain embodiments, the cathode material in the battery is selected from the group consisting of $Mn_2O_4$, $Ti(AlCl_4)_2$, $MnCl(AlCl_4)$, $Co(AlCl_4)_2$, and $V_2O_5$. In some embodiments, the cathode is "$LiM_xO_y$" [any lithium ion cathode material comprising a metal (M) and oxide (O)]. In one particular embodiment, the cathode material comprises spinel-$Mn_2O_4$. In another particular embodiment, the cathode material comprises $V_2O_5$.

In certain embodiments, the electrolyte in the battery comprises an ionic liquid. In some embodiments, the ionic liquid is an alum mate selected from the group consisting of alkylimidazolium alum mates, alkylpyridinium alum mates, alkylfluoropyrazolium aluminates, alkyltriazolium aluminates, dialkylpiperidinium aluminates, aralkylammonium aluminates, alkylalkoxyammonium aluminates, aralkylphosphonium alum mates, aralkylsulfonium alum mates, and mixtures thereof. In additional embodiments, the electrolyte further comprises aluminum chloride, and the ratio of aluminum chloride to the alum mate is greater than 1:1. In yet additional embodiments, the electrolyte in the battery further comprises an alkali metal halide additive. In some embodiments, the alkali metal halide additive is selected from the group consisting of: LiCl, lithium chloroaluminate, NaCl, KCl, $NH_4Cl$, and mixtures thereof.

In one embodiment, the electrolyte in the battery comprises ethylmethylimidazolium tetrachloroaluminate and aluminum chloride. In another embodiment, the molar ratio of aluminum chloride to ethylmethylimidazolium tetrachloroaluminate is greater than 1:1. In yet another embodiment, the electrolyte further comprises an alkali metal halide additive. In some embodiments, the alkali metal halide additive is selected from the group consisting of: LiCl, lithium chloroaluminate, NaCl, KCl, $NH_4Cl$, and mixtures thereof.

In yet another embodiment, the electrolyte in the battery is an ionic liquid electrolyte comprising a cation having one of the following structures:

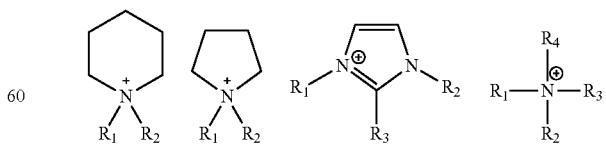

wherein $R_1$, $R_2$, $R_3$, and $R_4$ each independently comprise a non-ionizable substituent. The electrolyte further comprises an anion having one of the following structures: $AlCl_4^-$, $CF_3SO_3^-$, $B(CO_2)_4^-$, $N(SO_2CF_2CF_3)_2^-$, $N(SO_2CF_3)_2^-$, $N(SO_2F)_2^-$, $PF_6^-$, $BF_4^-$, and $BF_{4-x}(C_nF_{2n+1})_x^-$, wherein x=1, 2, or 3, and n=1, 2, 3, 4, 5, 6, 7, 8, 9, or 10.

In another embodiment, the electrolyte in the battery comprises an ionic constituent dissolved in an organic solvent having a high dielectric constant. In some embodiments, the organic solvent is selected from the group consisting of propylene carbonate, ethylmethylsulfone, ethylmethoxyethylsulfone, and methoxyethylmethylsulfone. In certain embodiments, the cathode material in the battery is selected from the group consisting of spinel-$Mn_2O_4$, $Ti(AlCl_4)_2$, $MnCl(AlCl_4)$, $Co(AlCl_4)_2$, and $V_2O_5$.

In certain embodiments, the battery is used in a grid storage application, vehicle battery application, portable electronic device application, or standard cell size battery application.

In another embodiment, the battery comprises an aluminum metal anode. The battery further comprises a λ-$MnO_2$ cathode capable of intercalating lithium ions during a discharge cycle and deintercalating the lithium ions during a charge cycle. The battery further comprises an ionic liquid electrolyte comprising lithium chloroaluminate dissolved in aluminum chloride and ethylmethylimidazolium tetrachloroaluminate, having a molar ratio of aluminum chloride to ethylmethylimidazolium tetrachloroaluminate greater than 1:1, wherein the electrolyte is capable of supporting reversible deposition and stripping of aluminum at the anode, and reversible intercalation and deintercalation of lithium at the cathode. In one embodiment, the battery maintains a discharge capacity of at least 50% of an initial discharge capacity after 50 cycles.

In another embodiment, a method of making a battery comprises providing an anode comprising aluminum metal. The method further comprises providing a cathode comprising a material capable of intercalating aluminum or lithium ions during a discharge cycle and deintercalating the aluminum or lithium ions during a charge cycle. The method further comprises providing an electrolyte capable of supporting reversible deposition and stripping of aluminum at the anode, and reversible intercalation and deintercalation of aluminum or lithium at the cathode.

In certain embodiments, the method of making a battery comprises providing a cathode material selected from the group consisting of $Mn_2O_4$, $Ti(AlCl_4)_2$, $MnCl(AlCl_4)$, $Co(AlCl_4)_2$, and $V_2O_5$.

In certain embodiments, the method of making a battery comprises providing an electrolyte having aluminum chloride and an ionic liquid aluminate selected from the group consisting of alkylimidazolium aluminates, alkylpyridinium aluminates, alkylfluoropyrazolium aluminates, alkyltriazolium aluminates, dialkylpiperidinium aluminates, aralkylammonium aluminates, alkylalkoxyammonium aluminates, aralkylphosphonium alum mates, aralkylsulfonium alum mates, and mixtures thereof. In some embodiments, the ratio of aluminum chloride to the alum mate in the electrolyte provided is greater than 1:1.

In certain embodiments, the method of making a battery comprises providing an electrolyte having aluminum chloride, an ionic liquid alum mate, and an alkali metal halide additive. In some embodiments, the alkali metal halide additive is lithium chloroaluminate.

In one particular embodiment, the method of making a battery comprises providing an electrolyte comprising aluminum chloride and ethylmethylimidazolium tetrachloroaluminate; wherein the molar ratio of aluminum chloride to ethylmethylimidazolium tetrachloroaluminate is greater than 1:1. In another embodiment, the method further comprises providing an alkali metal halide additive in the electrolyte. In certain embodiments, the alkali metal halide additive is lithium chloroaluminate.

In other embodiments, the method of making a battery comprises providing an ionic liquid electrolyte having a cation having one of the following structures:

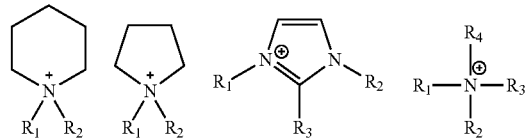

wherein $R_1$, $R_2$, $R_3$, and $R_4$ each independently comprise a non-ionizable substituent; and an anion having one of the following structures: $AlCl_4^-$, $CF_3SO_3^-$, $B(CO_2)_4^-$, $N(SO_2CF_2CF_3)_2^-$, $N(SO_2CF_3)_2^-$, $N(SO_2F)_2^-$, $PF_6^-$, $BF_4^-$, and $BF_{4-x}(C_nF_{2n+1})_x^-$, wherein x=1, 2, or 3, and n=1, 2, 3, 4, 5, 6, 7, 8, 9, or 10.

In yet other embodiments, the method of making a battery comprises providing an organic solvent electrolyte selected from the group consisting of propylene carbonate, ethylmethylsulfone, ethylmethoxyethylsulfone, and methoxyethylmethylsulfone.

BRIEF DESCRIPTION OF THE DRAWINGS

FIGS. 2A and 2B depict aluminum dissolution and deposition as a function of the electrolyte composition (acidic, basic, or neutral).

FIGS. 3A and 3B depicts aluminum dissolution and deposition for an acidic electrolyte mixture of 2:1 $AlCl_3$:EMIC for a number of cycles.

FIGS. 4A and 4B depict aluminum anode electrochemical behavior in an acidic electrolyte mixture of 2:1 $AlCl_3$:EMIC for a number of cycles.

FIGS. 5A and 5B depict electrochemical responses for $MnO_2$ and $AlMn_2O_4$ cathodes in an acidic electrolyte mixture of 2:1 $AlCl_3$:EMIC.

DETAILED DESCRIPTION

Figure 1:
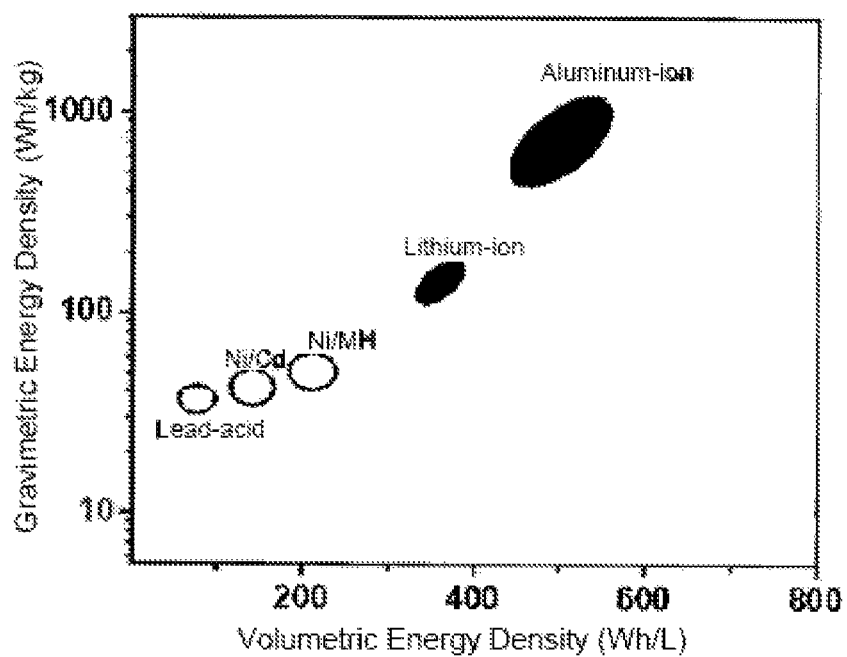
FIG. 1 depicts a comparison of the theoretical energy density of an aluminum battery with other batteries.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "aluminum battery" refers to an aluminum metal anode battery, unless specified otherwise.

As used herein, the term "lithium battery" refers to an lithium metal anode battery, unless specified otherwise.

As used herein, the term "aluminum metal" includes aluminum metal, aluminum metal alloys, or any other anode composition that includes aluminum metal, or combinations thereof, unless specified otherwise. In certain embodiments, an aluminum metal alloy may comprise at least one of the following alloying elements: copper, magnesium, manganese, silicon, titanium, or zinc. In other embodiments, the aluminum metal may include at least one insertion compound such as graphite, silicon nanowires, or titanium oxide.

As used herein, the term "aluminum ion" may refer to any ion comprising aluminum, including but not limited to $Al^{3+}$, $AlCl_4^-$, and $Al_2Cl_7^-$.

As used herein, the term "lithium ion" may refer to any ion comprising lithium, including but not limited to $Li^+$.

As used herein, the terms "primary" and "primary battery" refer to any kind of battery in which the electrochemical reaction is generally not reversible (i.e., the reaction cannot be reversed by running a current into the cell to restore the capacity of the battery). Unless otherwise specified, the terms "primary" or "primary battery" refer to batteries that are assembled in a charged state wherein the electrochemical reactions are generally not reversible.

As used herein, the terms "secondary" and "secondary battery" refer to rechargeable batteries wherein the electrochemical reactions are electrically reversible (i.e., the reaction can be reversed by running a current into the cell to restore the capacity of the battery). In certain embodiments, the secondary battery can achieve a number of "cycles" (discharge and charge) while maintaining a "functional discharge capacity" (i.e., the discharge capacity is more than 50%, 60%, 70%, 80% or 90% of the initial discharge capacity). Unless otherwise specified, the terms "secondary" or "secondary battery" may also refer to batteries that are assembled in a charged state wherein the electrochemical reactions are electrically reversible. In other words, the term may refer to a battery that does not need to be charged prior to its first use (like a typical primary battery), but is still capable of being recharged. For example, in one embodiment, an Al—$MnO_2$ battery with a lithium ion containing electrolyte constitutes a secondary, rechargeable battery that is assembled in a charged state.

As used herein, the term "room temperature ionic liquid" may refer to an ionic liquid electrolyte that is in its liquid state at room temperature (i.e., approximately 20-25° C.). In certain embodiments, the room temperature ionic liquid electrolyte remains in liquid state over a wide composition range. In one non-limiting example, an electrolyte comprising aluminum chloride and ethylmethylimidazolium tetrachloroaluminate ("EMIC") is in a liquid state as low as approximately 8° C. at approximately a 1:2 molar ratio of aluminum chloride:EMIC. Additionally, the electrolyte remains in a liquid state as low as −98° C. for a 2:1 molar ratio of aluminum chloride:EMIC. Such ionic liquids have the potential to deposit highly reactive metals such as aluminum that cannot be deposited by an aqueous solution.

As used herein, the term "high dielectric constant" may refer to an electrolyte that is electrically insulating and ionically conducting by virtue of dissolved ions.

In one embodiment, the battery may be formed with an aluminum anode. Aluminum is an attractive anode material for energy storage and conversion. Its relatively low atomic weight of 26.98 g/mol along with its trivalence gives a gram-equivalent weight of 8.99 and a corresponding electrochemical equivalent weight of 2.98 amp-hours per gram (Ah/g), compared with 3.86 Ah/g for lithium, 2.20 Ah/g for magnesium and 0.82 Ah/g for zinc. From a volume standpoint, aluminum should yield 8.04 $Ah/cm^3$, compared with 2.06 $Ah/cm^3$ for lithium, 5.85 $Ah/cm^3$ for zinc and 3.83 $Ah/cm^3$ for magnesium.

In comparison with a lithium battery, the theoretical voltage for aluminum is similar to lithium (2.86 volts v. 3.4 volts, respectively), and due to the mass of aluminum and its trivalency, the aluminum battery has the potential to yield 8-9 times better storage capacity than a lithium battery. If a cathode of approximately the same mass is used in each battery, the aluminum battery can provide approximately 4 times higher energy than the lithium battery. FIG. 1 provides a comparison of the theoretical energy density for various batteries, including aluminum and lithium batteries. Furthermore, an aluminum battery does not necessarily develop a solid electrolyte interface (SEI) layer between electrolyte and electrode. Also, the aluminum anode can be the protective containment (i.e., it is self-supporting). Additionally, aluminum is both an abundant and relatively inexpensive metal, and the use of a nonflammable ionic liquid electrolyte may provide an increased margin of safety.

Overall, an aluminum battery has the capability of achieving a much higher energy density than a lithium battery. Aluminum batteries have the potential for providing energy densities exceeding 200 Wh/kg (mass density) and 300 Wh/liter (volumetric density) at system-level costs below $250/kWh for various applications. In certain embodiments, the aluminum battery can be used in grid storage applications, vehicle battery applications, portable electronic device application, or standard cell size battery applications. In one particular embodiment, the aluminum battery is used for a grid storage application. In another particular embodiment, the aluminum battery is used in a vehicle battery application.

In one embodiment, the aluminum battery is a primary battery. In another embodiment, the aluminum battery is a secondary battery. In certain embodiments, the secondary battery is capable of having at least 50, 100, 150, 200, or 500 cycles prior to battery failure. In some embodiments, battery failure is related to the functional discharge capacity becoming only 50%, 60%, 70%, 80%, or 90% of the initial discharge capacity after a number of cycles. In other embodiments, battery failure is related to the inability to recharge the battery due to dendrite formation, oxide film formation, or other buildup on the anode or cathode. In one particular embodiment, the secondary battery is capable of having a functional discharge capacity greater than 50% of the initial discharge capacity after 50 cycles. In another embodiment, the secondary battery is capable of having a functional discharge capacity greater than 50% of the initial discharge capacity after 150 cycles.

In certain embodiments, the aluminum battery comprises: (1) an anode comprising aluminum metal, (2) a cathode comprising a material capable of intercalating aluminum or lithium ions during a discharge cycle and deintercalating the aluminum or lithium ions during a charge cycle, and (3) an electrolyte capable of supporting reversible deposition and stripping of aluminum at the anode, and reversible intercalation and deintercalation of aluminum or lithium at the cathode.

Anode

In certain embodiments, the anode material comprises aluminum metal. In other embodiments, the anode material comprises an aluminum metal alloy. Non-limiting examples of aluminum metal alloys include an alloying element selected from the group consisting of copper, magnesium, manganese, silicon, titanium, zinc, and mixtures thereof. In yet other embodiments, the anode material comprises an insertion compound. Non-limiting examples of insertion compounds include graphite, silicon nanowires, titanium oxide, and mixtures thereof.

In some embodiments, high purity aluminum foils and wires (99.999%, Aldrich) may be used as anodes and reference electrodes, respectively. In other embodiments, aluminum alloys (with Al as the predominant metal, at least 50%) could also be used as the anodes.

In certain embodiments, during the manufacture of the battery, the anode material is subjected to a pretreatment step to remove oxides from the material. In one embodiment, oxides are removed from the aluminum anode material through an electrochemical reduction step known to one of ordinary skill in the art.

Electrolyte

Suitable electrolytes for an aluminum battery are electrochemically stable within the operation window of the electrodes. In other words, in certain embodiments, the electrolyte is capable of supporting reversible deposition and stripping of aluminum at the anode, and reversible intercalation and deintercalation of aluminum at the cathode. In other embodiments, the electrolyte is capable of supporting reversible deposition and stripping of aluminum at the anode, and reversible intercalation and deintercalation of lithium at the cathode. Suitable electrolytes may include materials that assist in achieving a wide electrochemical window, good ionic conductivity, improved rate capability, long cycle ability, good capacity retention, and compatibility with the anode and cathode materials.

In certain embodiments, the electrolyte materials may be optimized through the addition of suitable co-solvents that may assist in reducing viscosity (increasing mobility) and/or increasing charge transfer number (increasing salt dissociation).

In certain embodiments, the electrolyte comprises an ionic liquid. In some embodiments, the ionic liquid is a room temperature ionic liquid. In certain embodiments, the room temperature ionic liquid comprises an aluminate material selected from the group consisting of alkylimidazolium aluminates, alkylpyridinium aluminates, alkylfluoropyrazolium aluminates, alkyltriazolium aluminates, aralkylammonium aluminates, alkylalkoxyammonium aluminates, aralkylphosphonium aluminates, and aralkylsulfonium aluminates.

In certain embodiments, the electrolyte includes a compound that is capable of assisting in dissociating $Al^{3+}$ or $Li^{+}$ for intercalation. In certain embodiments, the compound is selected from the group consisting of: aluminum chloride ($AlCl_3$), lithium trifluoromethane sulfonate, aluminum trifluoromethane sulfonate (aluminum triflate), butylpyridium chloride, 1-methyl-3-propylimidizolium chloride, a triazolium chloride, or an aluminum bis(trifluoromethanesulfonyl) imide salt. In particular, aluminum triflate and aluminum bis(trifluoromethanesulfonyl) imide salts may provide electron delocalization of the anions so that $Al^{3+}$ will not be tightly bonded.

In one embodiment, the molar ratio of the compound (e.g., aluminum chloride) to the aluminate in the ionic liquid is greater than 1:1, which forms an acidic electrolyte. In other embodiments, the molar ratio of the compound to aluminate in the electrolyte is greater than 1.5:1, 2:1, 3:1, 4:1, 5:1, or 10:1. In yet other embodiments, the molar ratio of the compound to alum mate is approximately 1.5:1, 2:1, 3:1, 4:1, 5:1, or 10:1.

In certain compositions comprising excess aluminum chloride to alum mate, the predominant aluminum species in solution is an anion such as $AlCl_4^-$ or $Al_2Cl_7^-$. These electrolyte compositions can prevent the formation of oxides on the aluminum anode surface as well as eliminate hydrogen gas evolution. Additionally, acidic electrolyte compositions can minimize the evolution of $Cl_2$, which can be prevalent in basic electrolyte compositions.

In one particular embodiment, the ionic liquid comprises ethylmethylimidazolium trifluoromethane sulfonate. In another particular embodiment, the ionic liquid comprises ethylmethylimidazolium tetrachloroaluminate ("EMIC"). In another embodiment, the ionic liquid comprises aluminum chloride added to the EMIC. The molar ratio of aluminum chloride to EMIC in the electrolyte material is greater than 1:1 in certain embodiments, wherein such combination creates an acidic solution. In other embodiments, the molar ratio of aluminum chloride to EMIC is greater than 1.5:1, 2:1, 3:1, 4:1, 5:1, or 10:1. In yet other embodiments, the molar ratio of aluminum chloride to EMIC is approximately 1.5:1, 2:1, 3:1, 4:1, 5:1, or 10:1.

Adjustment of the molar ratio of aluminum chloride to the alum mate can affect the Lewis acidity of the ionic liquid. At $AlCl_3$ mole fractions less than 0.5 in the electrolyte, the anions present are the Lewis bases $Cl^-$ and $AlCl_4^-$; hence these melts are regarded as basic. On the other hand, at $AlCl_3$ mole fractions greater than 0.5, the stable anions are $AlCl_4^-$ and $Al_2Cl_7^-$. Since $Al_2Cl_7^-$ is a potential source of the Lewis acid $AlCl_3$, these melts are regarded as acidic. Adjustment of the molar ratio of $AlCl_3$ changes the Lewis acidity of the $AlCl_3$-EMIC ionic liquid. This is expected to be a consideration in the design of the battery because it has been demonstrated that the deposition of aluminum occurs from the acidic medium.

In such a reaction, excess $AlCl_3$ dimerizes in the medium to form $Al_2Cl_6$, and the equilibrium occurs when $AlCl_3$ is dissolved in the aluminate (EMIC, for example) to form $AlCl_4^-$ and $Al_2Cl_7^-$, as shown below in equations (1) and (2):

$$[Al_2Cl_6]+Cl^- \leftrightarrow [Al_2Cl_7]^- \qquad (1)$$

$$2[AlCl_4]^- \leftrightarrow [Al_2Cl_7]^- + Cl^- \qquad (2)$$

In acidic electrolytes, the $Al_2Cl_7^-$ species is the electrochemically active species for deposition of aluminum metal according to the following net reaction (3):

$$4Al_2Cl_7^- + 3e \rightarrow Al + 7AlCl_4^- \qquad (3)$$

A neutral ionic liquid electrolyte possesses the widest electrochemical window for electrolyte solutions such as $AlCl_3$-EMIC. Therefore, in certain embodiments, it may be beneficial to have a neutral electrolyte solution. However, there are difficulties maintaining a neutral electrolyte composition comprising $AlCl_3$-EMIC, for example. Therefore, in certain embodiments, an alkali metal halide additive (i.e., neutralizing compound) can be added to the originally acidic electrolyte. In certain embodiments, the neutralizing compound is selected from the group consisting of NaCl, LiCl, lithium chloroaluminate, KCl, $NH_4Cl$, and mixtures thereof.

In one embodiment, the neutralizing compound is NaCl. In other embodiments, the neutralizing compound is KCl or, NH$_4$Cl. The salt neutralizes the Al$_2$Cl$_7^-$ anions via the reaction in equation (4) (wherein the neutralizing compound is NaCl in this non-limiting example):

$$NaCl(s)+[Al_2Cl_7^-] \leftrightarrow Na^+ + 2[AlCl_4]^- \quad (4)$$

In certain embodiments, lithium chloroaluminate is dissolved in the ionic liquid. In one embodiment, the ionic liquid is ethylmethylimidazolium tetrachloroaluminate. In these embodiments, the electrolyte works as a reservoir to provide and store lithium cations and chloroaluminate anions. The imidazolium cations in the electrolyte serve as charge carriers to neutralize the charge balance. The reactions are described as the following:

$$Anode: Al+7AlCl_4^- \leftrightarrow 4Al_2Cl_7^- + 3e^- \quad (5)$$

$$Cathode: 2MnO_2+Li^++e^- \leftrightarrow LiMn_2O_4 \quad (6)$$

$$Overall: Al+7AlCl_4^-+6MnO_2+3Li^+ \leftrightarrow 4Al_2Cl_7^- + 3LiMn_2O_4 \quad (7)$$

In other embodiments, the electrolyte comprises an ionic liquid electrolyte having:
a cation with one of the following structures:

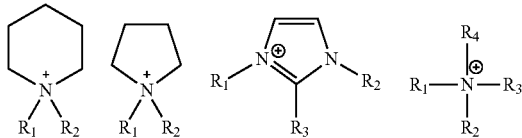

wherein R$_1$, R$_2$, R$_3$, and R$_4$ each independently comprise a non-ionizable substituent such as, for example, various hydrocarbons, alkyls, fluoro-alkyls, aryls, and ethers; and
an anion having one of the following structures: AlCl$_4^-$, CF$_3$SO$_3^-$, B(CO$_2$)$_4^-$, N(SO$_2$CF$_2$CF$_3$)$_2^-$, N(SO$_2$CF$_3$)$_2^-$, N(SO$_2$F)$_2^-$, PF$_6^-$, BF$_4^-$, and BF$_{4-x}$(C$_n$F$_{2n+1}$)$_x^-$, wherein x=1, 2, or 3, and n=1, 2, 3, 4, 5, 6, 7, 8, 9, or 10.

In certain embodiments, the cation in the ionic liquid is selected from the group consisting of: imidazolium, pyrrolidinium, piperidinium, triazolium, and tetraalkylammonium.

In yet another embodiment, the electrolyte comprises an organic solvent having a wide electrochemical window (e.g., similar or wider than the neutral melt window between −2 V and 2.5 V as shown in FIG. 2A) and a high dielectric constant. In certain embodiments, the organic solvent is selected from the group consisting of propylene carbonate, ethylmethylsulfone, ethylmethoxyethylsulfone, and methoxyethylmethylsulfone.

Cathode

In certain embodiments, the cathode comprises a material capable of intercalating aluminum or lithium ions during a discharge cycle and deintercalating the aluminum or lithium ions during a charge cycle. The cathode must readily incorporate Al(III) or Li, either as an anion or as the Al(III) or Li cation after shedding the Cl$^-$ ligands.

In certain embodiments, for each equivalent of Al which is plated on the anode, three equivalents of AlCl$_4^-$ will need to be incorporated in the cathode. In some embodiments, the electrolyte will tend to become more basic as Al is plated on the anode, but part of this problem will be alleviated by incorporation of the AlCl$_4^-$ anions in the cathode.

In certain embodiments, the cathode comprises an active material selected from the group consisting of: λ-MnO$_2$ (or λ-Mn$_2$O$_4$), Ti(AlCl$_4$)$_2$, MnCl(AlCl$_4$), Co(AlCl$_4$)$_2$, and V$_2$O$_5$. In some embodiments, the cathode is "LiM$_x$O$_y$," [herein defined as any lithium ion cathode material comprising a metal (M) and oxide (O)]. Nonlimiting examples of LiMxOy cathodes include lithium cobalt oxide, lithium iron phosphate, and lithium manganese oxide. In certain embodiments, the battery is a primary battery and the cathode is a material selected from the group consisting of Ti(AlCl$_4$)$_2$, MnCl(AlCl$_4$), Co(AlCl$_4$)$_2$, and LiM$_x$O$_y$.

In certain embodiments, aluminum is inserted into the cathode material lattice. In one particular embodiment, aluminum is inserted into spinel-Mn$_2$O$_4$ to form spinel AlMn$_2$O$_4$. In another embodiment, the cathode material may comprise layered structures of V$_2$O$_5$ aerogels and Al$^{3+}$. Hence, Al$_x$V$_2$O$_5$ material can be used as a possible cathode material for Al(III) insertion.

In certain embodiments, these active components can be mixed with a carbon material (such as carbon black, for example) to make them conducting, and mixed with a binder (such as PVDF binder in N-methylpyrrolidinole, for example) to hold the material together. In some embodiments, the cathode comprises between approximately 50-90% of AlMn$_2$O$_4$, Ti(AlCl$_4$)$_2$, MnCl(AlCl$_4$), Co(AlCl$_4$)$_2$, and/or Al$_x$V$_2$O$_5$, 1-20% of binder, and 1-40% of carbon material. In one particular embodiment, the cathode comprises approximately 80% of MnO$_2$ or AlMn$_2$O$_4$, approximately 10% of PVDF binder in N-methylpyrrolidinole, and approximately 10% of carbon black.

In yet another embodiment, the cathode may be an air cathode, thereby forming an aluminum-air battery.

In one non-limiting example, the cathode is prepared from Co(AlCl$_4$)$_2$ mixed with powdered graphite to make it conducting (and a binder to hold the material together). In this example, the net reaction during charging will be oxidation of Co(II) to Co(III). During this process, the AlCl$_4^-$ anion will be incorporated in the cathode for charge balance. The structure of Co(II) complexed by AlCl$_4^-$ anions in an ionic liquid has been shown to be discrete ions with the composition [Co(AlCl$_4$)$_3$]$^-$ in which the tetrachloroaluminate ions are bidentate and the Co(II) center is octahedrally coordinated. The structure of Co(AlCl$_4$)$_2$ in the solid state has four tetrachloroaluminate centers bound to each Co(II), two with bidentate coordination and two that are monodentate but bridging. Co(III) will always be octahedrally coordinated. Thus, oxidation of Co(II) to Co(III) is not expected to cause a large change in the coordination environment of the Co center.

In other non-limiting examples, Ti(II) and Mn(II) complexes may also be considered as a transition element for the cathode material.

In another embodiment, the cathode material is λ-MnO$_2$. In one example, during the cycle, Al dissolves in the electrolyte from the anode and AlCl$_4^-$ anions are formed, consuming the Cl$^-$ anions generated when Al(III) or Li$^+$ cations are incorporated in the cathode. During discharge, manganese in oxidation state IV will be reduced to a lower oxidation state at the cathode and the Al(III) or Li$^+$ ions enter the solid to compensate for the charge. In certain embodiments, the cathode material can be prepared in a "reduced" or uncharged state by reacting MnO$_2$ with triethylaluminum in a similar manner that butyllithium is used to incorporate Li in cathodes for Li-ion batteries. The cathode may then be "charged" by oxidation of the Mn oxide resulting in expulsion of Al(III) or Li$^+$ ions, which are subsequently complexed by chloride ions and then plated at the anode.

Spinel-type MnO$_2$ may be made by treating LiMn$_2$O$_4$ with aqueous acid. This λ-MnO$_2$ has the same structural framework of spinel, but with most of the lithium removed from the tetrahedral sites of the spinel lattice. The mechanism for the conversion of $LiMn_2O_4$ to $\lambda\text{-}MnO_2$ involves a disproportionation of the $Mn^{3+}$ ions into $Mn^{4+}$ (remains in the solid) and $Mn^{2+}$ (leaches out into the aqueous solution).

In certain embodiments, it is possible to insert $Al^{3+}$ into spinel $\lambda\text{-}Mn_2O_4$ to form spinel $AlMn_2O_4$. In one embodiment, the following discharge reactions can occur in an aluminum battery (the reverse reactions will occur during charge), as shown in equations (8), (9), and (10):

$$\text{Electrolyte: } AlCl_3 + [EMI]^+Cl^- \leftrightarrow [EMI]^+AlCl_4^- \quad (8)$$

$$\text{Anode: } Al + 7[AlCl_4]^- \leftrightarrow 4[Al_2Cl_7]^- + 3e^- \quad (9)$$

$$\text{Cathode: } \lambda\text{-}Mn_2O_4 + 4[Al_2Cl_7]^- + 3e^- \leftrightarrow AlMn_2O_4 + 7[AlCl_4]^- \quad (10)$$

$$\text{Net reaction: } \lambda\text{-}Mn_2O_4 + Al \rightarrow AlMn_2O_4 \quad (11)$$

where:

$$\lambda\text{-}Mn_2O_4 \equiv (\square)_{tet}[Mn_2]_{oct}O_4;$$

$$AlMn_2O_4 \equiv (Al)_{tet}[Mn_2]_{oct}O_4; \text{ and}$$

wherein the subscripts "tet" and "oct" refer, respectively, to 8a tetrahedral and 16d octahedral sites in the spinel lattice.

The edge-shared $Mn_2O_4$ spinel framework into/from which $Al^{3+}$ ions could be reversibly inserted/extracted is stable. The 3-dimensional diffusion of $Al^{3+}$ ions from one 8a tetrahedral site to another 8a tetrahedral site via the neighboring empty 16c octahedral site can support fast aluminum-ion diffusion through the lattice. Additionally, the edge-shared $Mn_2O_4$ framework with direct Mn—Mn interaction can provide good electronic conduction. The fast aluminum-ion diffusion together with the good electronic conduction can support high rate capability. The electrochemical cell can be represented as:

$$\lambda\text{-}Mn_2O_4|AlCl_3 + [EMI]^+Cl^-|Al$$

Theoretical voltage: 2.65 V

The theoretical capacities for the aluminum battery including a $\lambda\text{-}Mn_2O_4$ cathode are calculated and shown in Table 1 below. From these theoretical calculations, the aluminum battery has a distinct edge in capacity and energy density over the state-of-the-art lithium batteries.

TABLE 1

Calculated Theoretical Capacity for Aluminum Battery

| System | Cell Capacity (mAh/g) | Cell Energy Density (Wh/kg) | Cell Voltage (V) |
|---|---|---|---|
| Li-ion battery; $C_6$-LiCoO$_2$ | 140 | 404 | 4 |
| Al battery; Al-$\lambda$-Mn$_2$O$_4$ | 400 | 1,060 | 2.65 |
| Al battery; $C_6$-$\lambda$-Mn$_2$O$_4$ | 329 | 872 | 2.65 |
| Al-ion battery; TiO$_2$-$\lambda$-Mn$_2$O$_4$ | 274 | 315 | 1.15 |

In certain embodiments, methods of making an aluminum battery comprise providing an anode comprising aluminum metal. In certain embodiments, the methods further comprise providing a cathode comprising a material capable of intercalating aluminum or lithium ions during a discharge cycle and deintercalating the aluminum or lithium ions during a charge cycle. In certain embodiments, the methods further comprise providing an electrolyte capable of supporting reversible deposition and stripping of aluminum at the anode, and reversible intercalation and deintercalation of aluminum or lithium at the cathode. In some embodiments, the electrolyte comprises an ionic liquid. In other embodiments, the electrolyte comprises an organic solvent having a high dielectric constant.

In some embodiments, batteries for grid storage applications may be formed. In other embodiments, batteries for vehicle applications may be formed. In yet other embodiments, batteries for portable electronic devices may be formed.

In another example, a coin cell battery may be formed. In such an example, a cathode slurry for the battery may be made by homogenizing the active components of the cathode with the carbon material (such as carbon black, for example) and the binder (such as PVDF binder in N-methylpyrrolidinole, for example). In certain embodiments, the cathode slurry is dried at an elevated temperature (>100° C.) and then pressed under a load (e.g., 1 ton load) for a certain length of time before cutting into a disk (e.g., 1.3 cm diameter disk). In some embodiments, the cathode disks are further dried at an elevated temperature (>100° C.) under a vacuum before assembling into the coin cell battery. In certain embodiments, the coin cell battery is assembled with an aluminum anode, MnO$_2$ cathode, and an electrolyte capable of supporting reversible deposition and stripping of aluminum at the anode and reversible intercalation and deintercalation of aluminum or lithium at the cathode, wherein the coin cell battery comprises either Celgard or carbon fiber filter paper as the separator. In certain embodiments, the cells may be cycled under different current densities on Arbin instruments.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

EXAMPLES

Example 1

In this example, the salt of EMIC was synthesized and purified, and three electrolyte mixture AlCl$_3$ and EMIC were made. The ratios of AlCl$_3$:EMIC were approximately 1:1.5 (basic), 1:1 (neutral), and 2:1 (acidic). All three electrolytes were tested for their electrochemical potential using a platinum and aluminum coin cell disks for the cathode and anode, with the electrolyte coupled with aluminum wire. The results are shown in FIGS. 2A and 2B.

It was observed that the neutral ionic liquid electrolyte (1:1 AlCl$_3$:EMIC) had the widest electrochemical potential window (FIG. 2A). However, the aluminum reaction only proceeded in the acidic electrolyte (2:1 AlCl$_3$:EMIC). In the acidic electrolyte, the current efficiency of the aluminum reaction ($C_{dissolution}/C_{deposition}$) was observed to be close to 100% (FIG. 2B).

Example 2

Aluminum deposition and dissolution were studied using similar test parameters as Example 1 for an acidic electrolyte mixture of 2:1 $AlCl_3$:EMIC. Sixty-five charge/discharge cycles were carried out at 5 mV/s. The results are shown in FIGS. 3A and 3B.

It was observed that the acidic electrolyte mixture was capable of intercalating aluminum ions during the discharge cycles and deintercalating the aluminum ions during the charge cycles before perceived failure in the 65th cycle.

Example 3

Aluminum anode electrochemical behavior was studied using similar test parameters as Example 1 for an acidic electrolyte mixture of 2:1 $AlCl_3$:EMIC. Tests were carried out at 100 mV/s for 50 cycles and 10 mV/s for 150 cycles. The results are shown in FIGS. 4A and 4B.

It was observed that the aluminum anode showed good cyclability and high current density in the acidic electrolyte mixture for 150 cycles.

Example 4

$MnO_2$ and $AlMn_2O_4$ cathode materials were studied for their electrochemical response using similar test parameters as Example 1 for an acidic electrolyte mixture of 2:1 $AlCl_3$:EMIC. Tests were carried out at 1 mV/s. The results are shown in FIGS. 5A and 5B.

It was observed that both $MnO_2$ and $AlMn_2O_4$ showed redox activity in the acidic electrolyte mixture.

Example 5

In this example, a coin cell battery was prepared. The cathode slurry was prepared with 80 wt % of active materials ($MnO_2$ or $AlMn_2O_4$), 10 wt % carbon black and 10 wt % PVDF binder in N-Methylpyrrolidinole. The slurry was homogenized for about 5 min before casting on stainless steel foil with a doctor blade. After drying at approximately 120° C., the electrode was pressed under 1 ton load for about 1 min before cutting into discs with diameter of approximately 1.3 cm. The electrode discs were further dried at approximately 120° C. under vacuum for 24 hrs before assembling coin cells. The coin cells were assembled inside a well-controlled Argon filled glove box with both moisture and oxygen levels below 1 ppm. The coin cells were assembled with aluminum as the anode, $MnO_2$ as the cathode, and an acidic electrolyte mixture of 2:1 $AlCl_3$:EMIC as the electrolyte with either Celgard or carbon fiber filter paper as the separator. The cells were cycled under different current densities on Arbin instruments.

Example 6

High purity aluminum foils and wires (99.999%, Aldrich) were used as anodes and reference electrodes, respectively. Al foils were cut into disks with diameters of 1.0 cm and 1.6 cm to fit the electrochemical cells. These Al disks were mechanically polishing by sandpaper. Nylon cloth with 5.0 µm alumina and microcloth with 0.05 µm alumina (polishing kit, Pine Instrument), following chemically polishing in an acid mixture of 25% (by volume) $H_2SO_4$ (98%), 70% $H_3PO_4$ (85%) and 5% $HNO_3$ (52.5%). Al wires were cleaned by chemical polishing. After washing using by acetone and drying, they were placed in a glove box (VAC, moisture <1 ppm, oxygen <4 ppm) in inert atmosphere for later use.

λ-$MnO_2$ was synthesized following Hunter's method. The precursor $LiMn_2O_4$ was prepared by ball-milling the mixture of 10 g $Mn_2O_3$ and 2.34 g $Li_2CO_3$ and sintering the mixture at 850° C. in air for 1 hour. 2 g $LiMn_2O_4$ was added into 100 ml DI water to form a slurry solution. 2M $H_2SO_4$ was dropped into this slurry under stirring, till until the pH was stable at 1. After washing with distilled water and drying in vacuum oven at 100° C. overnight, λ-$MnO_2$ powder was obtained.

The cathodes were fabricated by a conventional coating method. A slurry consisting of the as-synthesized λ-$MnO_2$ (80 wt. %), Super-S carbon black (10 wt. %), and polyvinylidene fluoride (PVDF, 10 wt. %) in N-methyl-2-pyrrolidone (NMP) was uniformly spread onto a tungsten (W) foil. The active material loading was 1-2 mg/$cm^2$. The electrodes were pressed under 1 ton/$cm^2$ and dried in a vacuum oven at 120° C. overnight.

Ionic liquid, slightly acidic 1-ethyl-3-methyl imidazolium chloroaluminate, was prepared by mixing aluminum trichloride (homemade) and 1-ethyl-3-methyl imidazolium chloride (homemade) with a molar ratio of 1.1:1.0 in the glove box. The acidicity of the ionic liquid can be adjusted by changing the molar ratio. A metal halide additive, lithium chloroaluminate (nonhydrate, Aldrich), was dissolved in the ionic liquid to form the electrolyte. Up to 4.0 mol/Kg lithium chloroaluminate is able to dissolve in the acidic (1.1:1.0) ionic liquid.

Three-electrode Swagelok cells were used to study the electrochemical behavior of Al and λ-$MnO_2$ in the ionic liquid electrolyte. An Al disk and a $MnO_2$/W disk were used as working electrodes, W disk as a counter electrode, and Al wire as a reference electrode. Two pieces of filter paper clamping the Al wire were used as a separator. The electrolyte, acidic 1-ethyl-3-methyl imidazolium chloroaluminate, has a wide electrochemical window on W electrode, along with reversible Al deposition and dissolution. This makes a W disk a good candidate for counter electrode and current collector of $MnO_2$ electrodes. Cyclic voltammetry (CV) was conducted using a Princeton Applied Research Model 263 potentiostat. For the Al working electrode, CVs were recorded at 1 mV/s sweep rate between −0.3 V and +0.3 V vs. Al/$Al^{3+}$. For the $MnO_2$ electrode, CVs were recorded at 1 mV/s between 1.5 V and 2.4 V vs. Al/$Al^{3+}$.

Figure 6B:
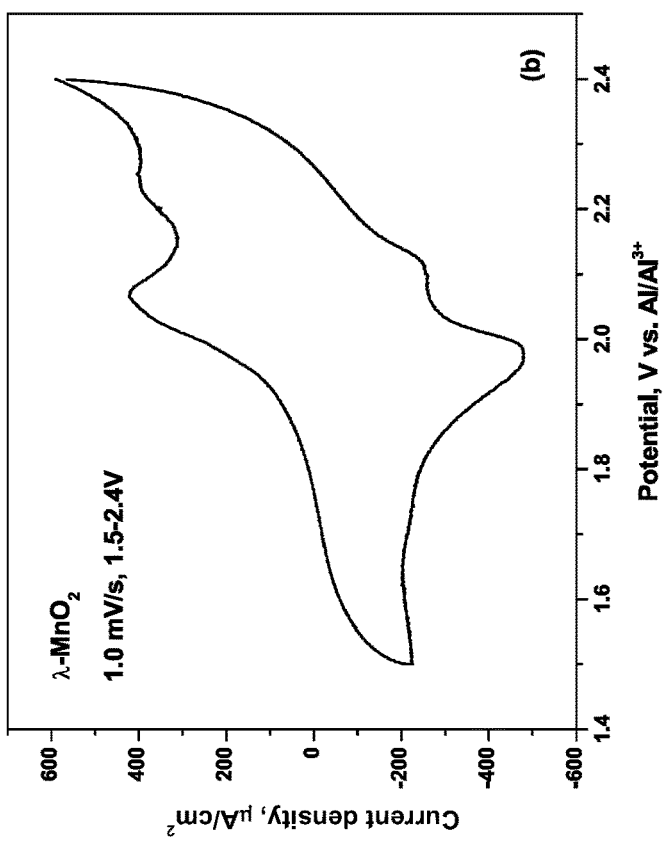
FIGS. 6A and 6B depict cyclic voltammograms of (a) Al and (b) λ-$MnO_2$ in three electrode Swagelok cells with electrolyte of lithium chloroaluminate (3.0 mol/kg) dissolved in 1-ethyl-3-methyl imidazolium chloroaluminate (1.1:1).
Figure 6A:
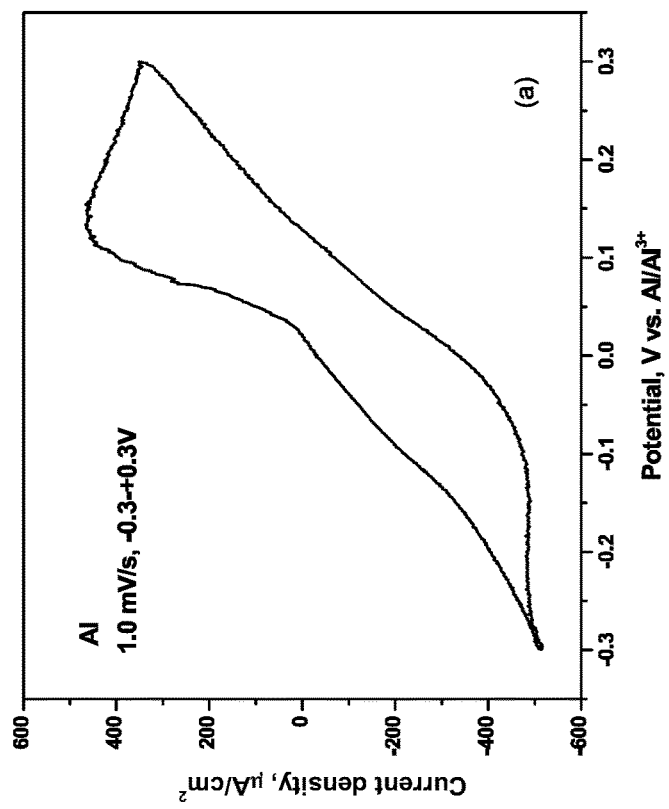

FIGS. 6A and 6B show the cyclic voltammograms of Al and λ-$MnO_2$ in an electrolyte of lithium chloroaluminate (4.0 mol/Kg) dissolved in 1-ethyl-3-methyl imidazolium chloroaluminate (1.1:1.0). It can be seen that Al dissolution and deposition start at 40 mV and 120 mV, respectively, indicating the ease of Al deposition in this electrolyte. The CV cycle with a nearly equivalent of cathodic and anodic charges can repeat for 100 times, which validates the reversibility of this reaction and is in agreement with previous report. It is found that the oxide thin film on Al surface, which is inevitably formed even after mechanical and chemical polishing, is important to sustain the cyclability. If this thin film is mechanically removed in the glove box, the currents abruptly change during CV cycles and the cell failed by short circuit after several cycles. It is believed that removal of the oxide film is incomplete or that the oxide film reacts with chloroaluminate anions to form a kind of solid electrolyte interface (SEI) layer on Al surface, which slowdowns the reaction between Al and the electrolyte and mitigates the formation of dendrites. Because Al does not react with the electrolyte to produce new oxides, this oxide layer effectively sustains the steady cycling of Al dissolution and deposition, in contrast with the negative role of an oxide film in aqueous Al batteries.

In FIG. 6B, λ-MnO$_2$ shows a dual-peak redox behavior in the ionic liquid electrolyte, which is identical to the lithium intercalation behavior in traditional organic electrolytes. The two pairs of peaks between 1.5 V and 2.5 V indicate a two-stage process of lithium insertion and extraction in the spinel structure, which is associated with the structure ordering when lithium ions occupy one half of the tetrahedral 8a sites. The increase of anodic current at potential >2.3V is attributed to the evolution of chlorine in this ionic liquid electrolyte. This is the anodic limit that hinders other materials with higher oxidation potential as cathode in chloroaluminate-based electrolyte. We also study the possibility of Al ion intercalation in λ-MnO$_2$ contributing the redox reaction. Without adding lithium chloroaluminate, λ-MnO$_2$ shows none of the redox peaks in the CV cycling in the pure ionic liquid electrolyte. This confirms that the redox response in FIG. 1(b) only comes from lithium insertion and extraction.

Example 7

Coin cells (CR2032) were used as prototype to evaluate Al—MnO$_2$ battery. An Al disk was used as the anode, a MnO$_2$/W disk as the cathode, Celgard 3014 as the separator, and lithium chloroaluminate dissolved in 1-ethyl-3-methyl imidazolium chloroaluminate as the electrolyte. The cells were tested using a MTI battery charger. Two charge-discharge regimes, constant current (CC) and constant current-constant voltage (CC-CV) were used. In a CC regime, the cells were charged at a C/10 (15 µA/g) current to 2.5 V and discharged at the same current to 1.3 V. In a CC-CV regime, the cells were charged at a C/10 (15 µA/g) current to 2.4 V, held at 2.4 V until the current was less than 1 µA/g, and then discharged at the same current to 1.0 V. The current rate was defined as per the theoretical specific capacity of λ-MnO$_2$ (1C is equal to 148 mA/g).

Figure 7B:
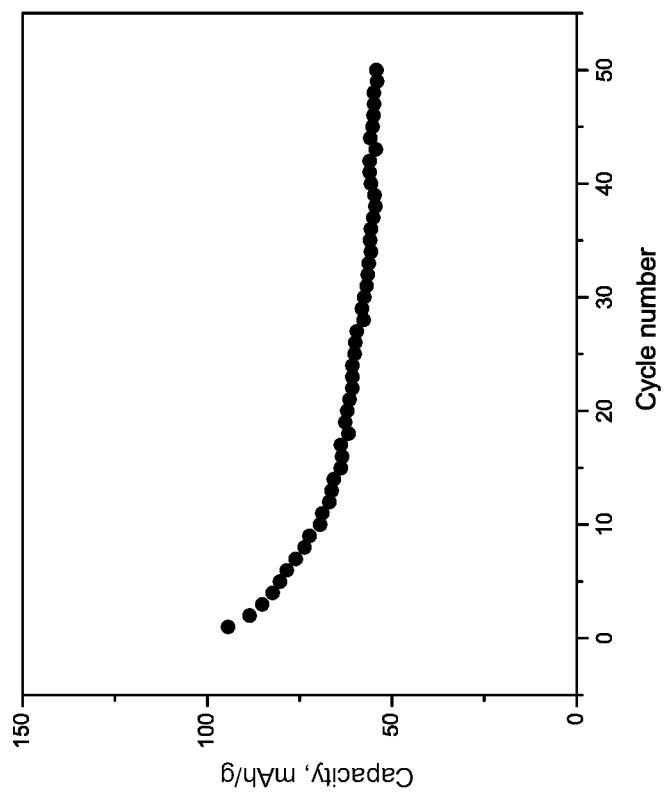
FIGS. 7A and 7B depict battery performance of Al—$MnO_2$ coin cells with electrolyte of lithium chloroaluminate (3.0 mol/kg) dissolved in 1-ethyl-3-methyl imidazolium chloroaluminate (1.1:1), showing (a) a typical charge-discharge curve and (b) discharge capacity vs. Cycle numbers at a C/10 (15 mA/g) current rate.
Figure 7A:
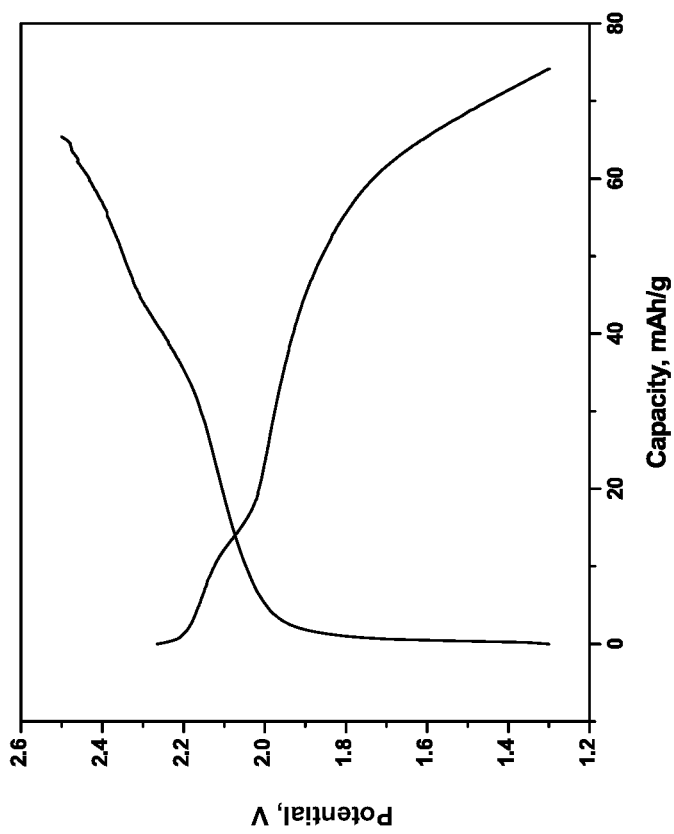

The open circuit voltage (OCV) of the battery is 2.12 V, which is quite stable in an observation at open circuit condition for 24 hours. This implies that both Al and MnO$_2$ do not react with the electrolyte at open circuit condition. FIG. 7A shows a typical charge-discharge curve with a constant current (CC) regime at C/10 (15 mA/g) current rate between 1.3 V-2.5 V. Both of charge and discharge curves appear a two-stage process, which is corresponding to the dual-peak redox behavior in the CV. The first discharge plateau is around 2.15 V and the second around 1.95 V. The specific charge and discharge capacity are 65 mAh/g and 74 mAh/g based on MnO$_2$ weight. The larger discharge capacity than charge capacity could be attributed to inadequate charge due to the intervention of chlorine evolution. This results in rapid capacity fading under CC charge-discharge regime. In order to mitigate this effect, constant current-constant voltage (CC-CV) regime was adopted to charge this battery. FIG. 7B shows the plot of discharge capacity vs. cycle numbers with a regime that the cell is charged to 2.4 V by a C/10 (15 µA/mg) current and kept at 2.4 V until the current is less than 1 µA/mg. The discharge capacity is 94 mAh/g at the first cycle, while decreases to 54 mAh/g after 50 cycles. The capacity fading mostly occurs in the first 10 cycles. It is known that in a lithium ion battery, the capacity fading of LiMn$_2$O$_4$ cathode largely originates from the dissolution of Mn in the electrolyte. In the case of Al—MnO$_2$ battery, it appears that the dissolution of Mn is also the major cause of capacity fading. In the discharged state, the electrolyte becomes a more acidic chloroaluminate ionic liquid where low-valence Mn ions may dissolve. The approaches to improving LiMn$_2$O$_4$ cathode in lithium ion batteries maybe also work for MnO$_2$ cathode in rechargeable Al batteries.

What is claimed is:

1. A secondary battery comprising:
   an anode comprising aluminum metal;
   a cathode comprising a lithium metal oxide; and
   an ionic liquid electrolyte consisting essentially of aluminum chloride, ethylmethylimidazolium chloride, and lithium chloroaluminate, the aluminum chloride and ethylmethylimidazolium chloride being in a molar ratio greater than 1:1.

2. The battery of claim 1, wherein the secondary battery is assembled in a charged state.

3. The battery of claim 1, wherein the secondary battery maintains a discharge capacity of at least 50% of an initial discharge capacity after 50 discharge cycles.

4. The battery of claim 1, wherein the anode is an aluminum metal alloy.

5. The battery of claim 4, wherein the aluminum metal alloy comprises an element selected from the group consisting of: copper, magnesium, manganese, silicon, titanium, zinc, or mixtures thereof.

6. The battery of claim 1, wherein the electrolyte comprises an organic solvent having a high dielectric constant.

7. The battery of claim 6, wherein the organic solvent is selected from the group consisting of propylene carbonate, ethylmethylsulfone, ethylmethoxyethylsulfone, and methoxyethylmethyl sulfone.

8. The battery of claim 1, wherein the battery is used in a grid storage application, vehicle battery application, portable electronic device application, or standard cell size battery application.

9. The battery of claim 1, wherein the lithium metal oxide is lithium iron phosphate.

10. The battery of claim 1, wherein the lithium metal oxide is lithium cobalt oxide.

11. The battery of claim 1, wherein the lithium metal oxide is lithium manganese oxide.

12. The battery of claim 1, wherein the molar ratio of the aluminum chloride to the ethylmethylimidazolium chloride is 1.1:1.0.

13. The battery of claim 10, wherein the lithium cobalt oxide has the formula LiCoO$_2$.

14. The battery of claim 11, wherein the lithium manganese oxide has the formula LiMn$_2$O$_4$.

15. A secondary battery comprising:
   an anode comprising aluminum metal;
   a cathode comprising lithium iron phosphate; and
   an ionic liquid electrolyte consisting essentially of aluminum chloride, ethylmethylimidazolium chloride, and lithium chloroaluminate, the aluminum chloride and ethylmethylimidazolium chloride being in a molar ratio greater than 1:1,
   wherein the electrolyte is capable of supporting reversible deposition and stripping of aluminum at the anode, and reversible intercalation and deintercalation of lithium at the cathode.

* * * * *